(No Model.)
W. M. DEUTSCH.
METHOD OF CLEANSING FILTERS.
No. 553,641. Patented Jan. 28, 1896.
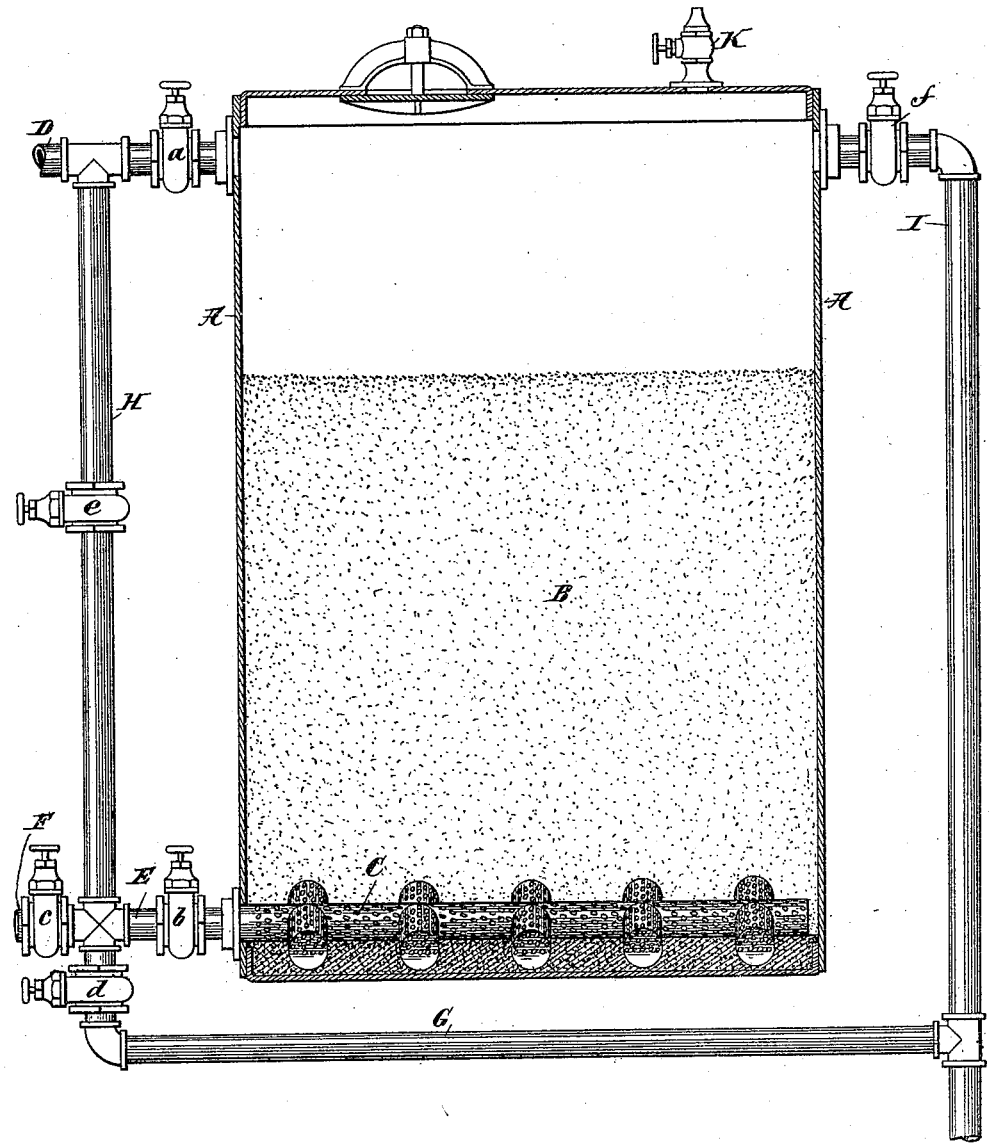

UNITED STATES PATENT OFFICE.

WILLIAM M. DEUTSCH, OF ELIZABETH, NEW JERSEY.

METHOD OF CLEANSING FILTERS.

SPECIFICATION forming part of Letters Patent No. 553,641, dated January 28, 1896.

Application filed October 21, 1891. Renewed September 20, 1894. Serial No. 523,645. (No model.)

*To all whom it may concern:*

Be it known that I, WILLIAM M. DEUTSCH, a citizen of the United States, residing at Elizabeth, county of Union, and State of New Jersey, have invented certain new and useful Improvements in the Method of Cleansing Filters, fully described and represented in the following specification and the accompanying drawing, forming a part of the same.

The object of the present invention is to provide an improved method of cleansing filters, the method being especially applicable to that class of filters employing gravel or similar material in the strainers, a thorough working over and cleansing of the strainer material being produced in addition to the cleansing effect upon the filter-bed of sand or other filtering media.

In my improved method air is compressed within the strainer and filter-bed and then allowed to escape suddenly, a very effective cleansing of the strainer being secured by the thorough agitation produced by the sudden outrush of the air, so that any impurities lodged in the strainer will be removed and come out with the first water that follows the air. The compression and sudden expansion of the air also acts upon the filter-bed to break up any bunches of the filtering media or deposits of foreign material therein, and results in a very complete cleansing and aeration of the bed, the effect of this aeration being found very durable.

It is evident that my improved method is of general application in filters, although of especial value in filters employing gravel or similar material in the strainers, and that the desired result may be produced by widely different arrangements of filtering apparatus.

In the accompanying drawing I have shown for the purpose of illustration a filter of a common construction, and a full description of my invention will now be given as carried out thereby.

In the drawing, in which the filter is shown in sectional elevation, A is the filter containing the usual bed, B, of sand or other suitable filtering media through which the water is filtered from the top to the bottom of the filter. The strainer shown in the present case is of common form, consisting of a pipe C of brass or other suitable material located at the bottom of the filter and provided with cross-arms, so as to underlie a large part of the filter-bed, the pipe and cross-arms being perforated and filled or partially filled with gravel, through which the filtered water is strained.

D is the inlet or supply pipe entering the top of the filter and controlled by a cock $a$, and E the outlet-pipe at the bottom of the filter connecting with the strainer-pipe C and controlled by cock $b$. With this outlet-pipe connects the delivery-pipe F for the filtered water controlled by a cock $c$, and the drain-pipe G, controlled by the cock $d$, so that connections may be opened from the outlet-pipe E to the delivery-pipe or drain-pipe. The pipe H, controlled by cock $e$, connects the supply-pipe with the outlet-pipe, and the waste-pipe I, controlled by cock $f$, connects the top of the filter with the drain, these pipes H I forming the usual connections for washing the filter. An air-cock K opens into the top of the filter.

The operations of filtering and washing are well understood and need not be described.

When the filter is to be cleansed by my method, all of the water is first drawn out of the filter through the outlet E and drain G, the air-cock at the top of the filter being open and the cock $c$ in the delivery-pipe F closed. The cock $d$ controlling the drain-pipe G and the air-cock K are then closed. The cock $f$ on waste-pipe I being closed, the cock $a$ is opened and the water is allowed to enter the filter through pipe D until the filter is full. During this operation the air which has filled the upper part of the filter above the bed and the interstices between the particles of filtering media in the bed and strainer will be forced downward by the incoming water and compressed in the strainer and the lower part of the bed.

When the air is compressed in the bed by the column of water above it, the filter preferably being practically filled so as to secure as high a pressure as convenient, the cock $d$ on the drain-pipe G is suddenly opened fully, permitting the air to escape. The air under high pressure from the water in the filter will now expand and rush out with great force, churning up the bed and the gravel in the strainers and agitating the latter thoroughly, so as to loosen all the impurities lodged therein, which will come out with the first water that follows the air. The compression of the air within the bed by the column of water above it also results in an aeration of the bed, the effect of which is found very durable. This result of aeration will be secured without the sudden release of the air, but the air is preferably suddenly released, as above stated, so as to secure the cleansing and increased aerating effect resulting from the agitation caused by the sudden outrush of air. It may be found desirable in some cases, in order to increase the aerating effect, to permit the air to stand within the bed under the pressure of the water for a few minutes before permitting it to escape, but the time required for filling the filter with water will usually be a sufficient time to hold the air under pressure.

What I claim is—

1. The method of cleansing filters, which consists in compressing air within the bed and strainer by pressure of a body of water, and allowing the compressed air and water to escape suddenly, substantially as described.

2. The method of cleansing filters, which consists in drawing off the water from the filter and filling the filter with air, closing the filter against the escape of air and filling the filter with water from the inlet side of the filter, whereby the air is compressed within the bed and strainer, and opening the filter to allow the sudden escape of the compressed air, substantially as described.

3. The method of cleansing filters, which consists in drawing off the water from the filter and filling the filter with air, closing the filter against the escape of air on the outlet side of the bed and filling the filter with water from the inlet side of the filter, whereby the air is compressed within the bed by the water, and flowing off the compressed air and waste water before resuming the filtering operation, substantially as described.

In testimony whereof I have hereunto set my hand in the presence of two subscribing witnesses.

WILLIAM M. DEUTSCH.

Witnesses:
C. C. SAWYER,
J. J. KENNEDY.